G. E. HARRISON.
MOTOR PLOW.
APPLICATION FILED OCT. 28, 1911.

1,047,215.

Patented Dec. 17, 1912.
3 SHEETS—SHEET 2.

Witnesses

Inventor
G. E. Harrison.
By
Attorneys

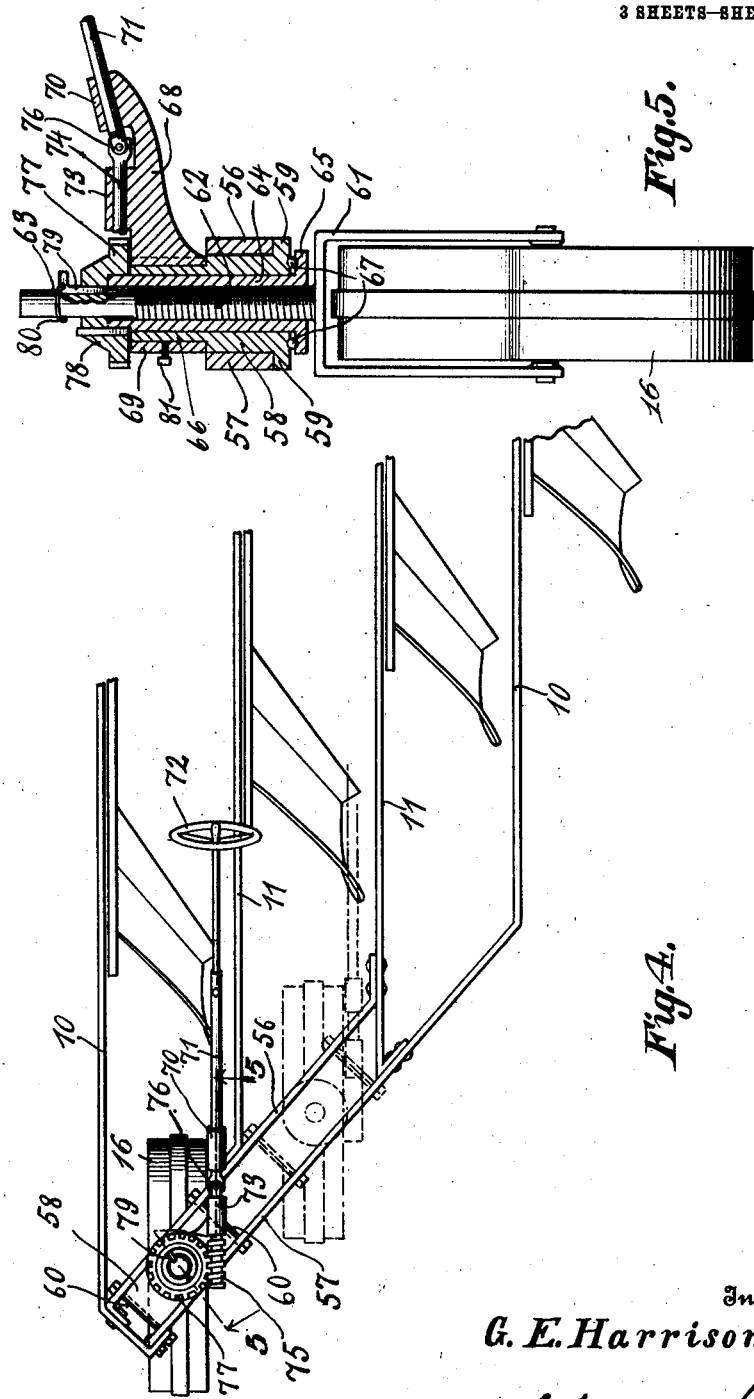

UNITED STATES PATENT OFFICE.

GEORGE E. HARRISON, OF BILLINGS, OKLAHOMA.

MOTOR-PLOW.

1,047,215.  Specification of Letters Patent.  Patented Dec. 17, 1912.

Application filed October 28, 1911. Serial No. 657,288.

*To all whom it may concern:*

Be it known that I, GEORGE E. HARRISON, a citizen of the United States, residing at Billings, in the county of Noble and State of Oklahoma, have invented certain new and useful Improvements in Motor-Plows, of which the following is a specification.

This invention relates to that class of plows embodying a wheeled frame carrying the shares, and a motor mounted on the frame and operatively connected to the wheels thereof for propelling the same; and it is the object of the invention to provide a machine of this kind which can be used as a traction engine, and also utilized as a stationary source of power for any purpose desired.

The invention also has for its object to provide a novel arrangement of steering wheel, the same being located behind the plowshares, and also being adjustable for a purpose to be hereinafter described.

A further object of the invention is to provide improved means for raising and lowering the rear end of the machine.

Other objects and advantages will appear in the detailed description of the construction and operation of the machine, appearing hereinafter.

In order that the invention may be better understood, reference is had to the accompanying drawings, in which—

Figure 1:
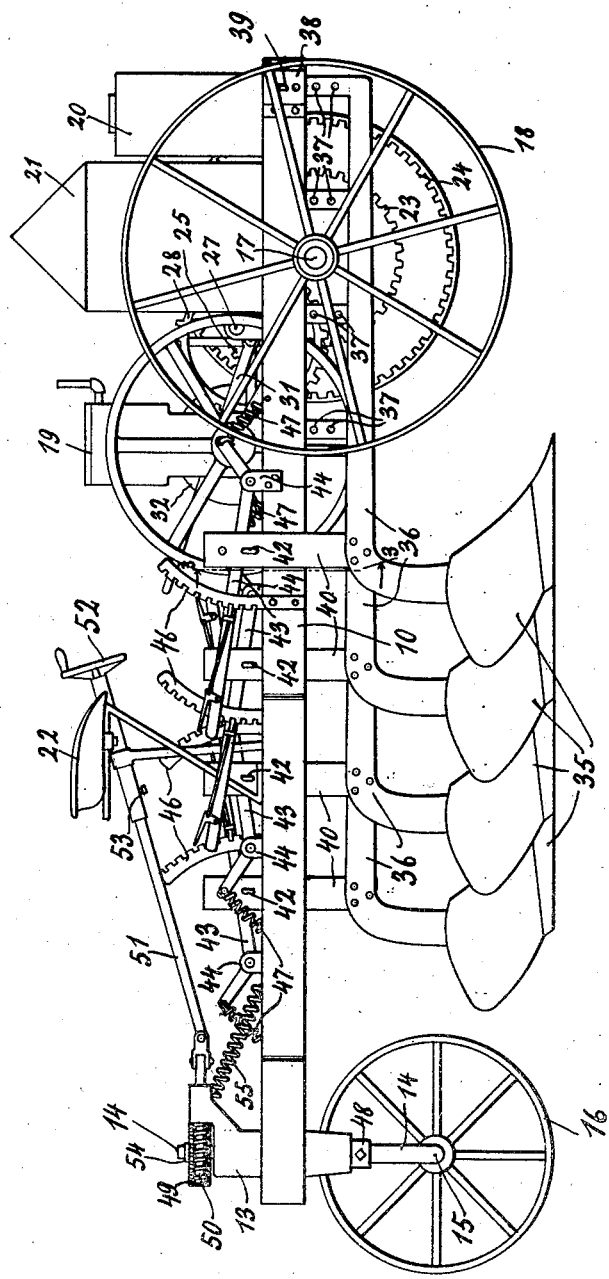
Figures 2, 3:
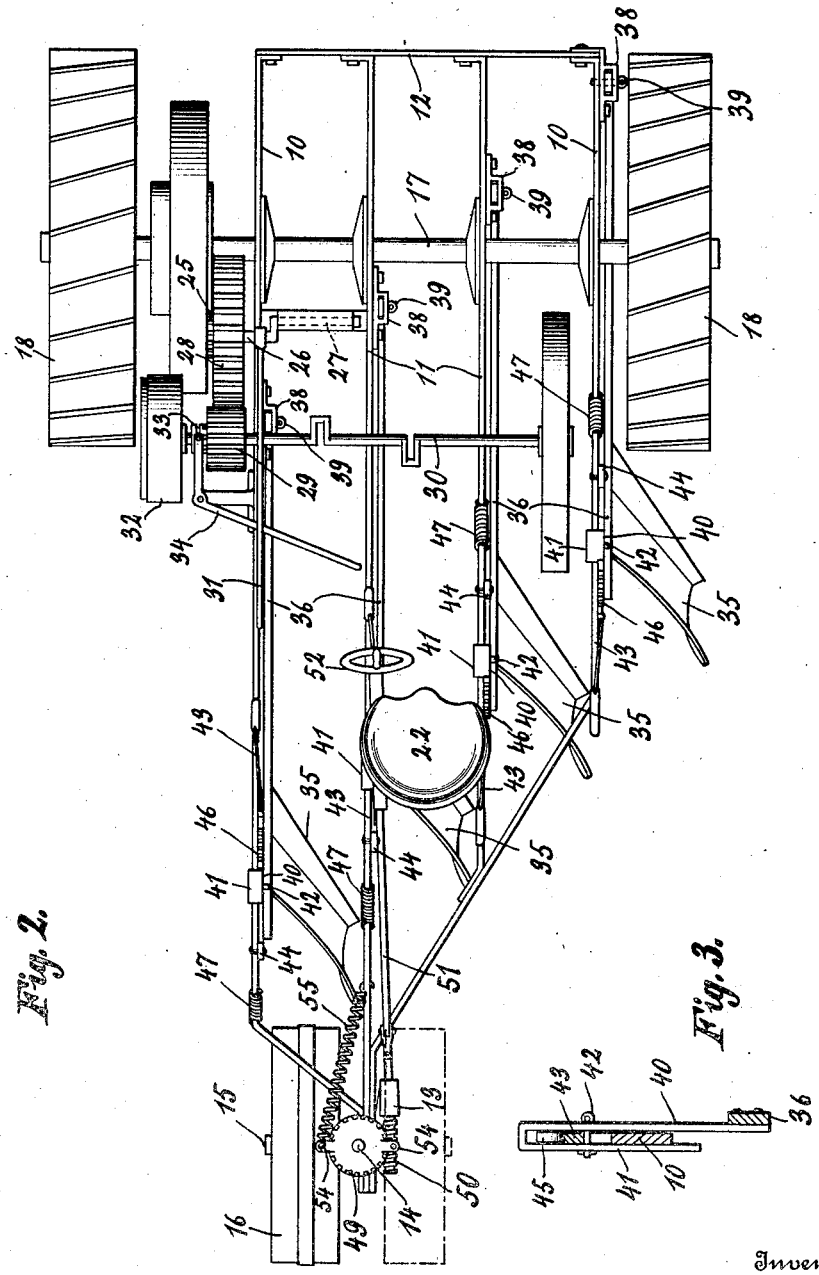

Figure 1 is a side elevation of the machine; Fig. 2 is a plan view thereof; Fig. 3 is a vertical section on the line ?—3 of Fig. 1; Fig. 4 is a plan view of the rear end of the machine showing a modification of the means for adjusting the steering wheel, and also a means for raising and lowering the rear end of the machine; Fig. 5 is a cross-section on the line 5—5 of Fig. 4.

Referring specifically to the drawings, the frame of the machine comprises parallel side bars 10 and intermediate bars 11, said bars extending longitudinally and being connected at their front ends by a cross bar 12. The side bars converge at the rear and carry a bearing bracket 13 at this point, in which is swiveled the vertical portion or stem 14 of an axle 15 on which a steering wheel 16 is mounted. At the front end of the frame is mounted an axle 17 carrying traction wheels 18 at its ends, said traction wheels being located on opposite sides of the frame outside the side bars 10.

The traction wheels are driven by a motor 19, which is, preferably, an internal-combustion engine. A fuel tank and a water tank are shown at 20 and 21, respectively. The motor and the fuel and water tanks are mounted on the frame at the front end thereof, and substantially midway between the front and rear ends of the frame is located a seat 22 for the driver.

On the axle 17 is fixed a gear wheel provided with a suitable differential gear and having concentric external and internal gear teeth 23 and 24, respectively. Between these gear teeth is mounted a pinion 25 which is adjustable to mesh with either set of teeth for the purpose of driving the axle in either direction. The pinion is carried by the crank portion 26 of a rock shaft 27 on which is also mounted a spur gear 28 which is in mesh with a pinion 29 on the motor shaft 30. The motion of the motor shaft is therefore transmitted by the pinion 29 to the gear 28, and the pinion 25 transmits the motion to the axle through the gears 23 or 24.

The following means are provided for placing the pinion 25 in mesh with either one of the gears 23 or 24, and for disengaging the gear 28 from the pinion 29: The shaft 27 has a crank bend 26 on which the gear 28 is loosely mounted. The pinion 25 is connected to the gear 28 so as to turn therewith. The shaft 27 is mounted for rocking movement in a suitable bearing carried by the frame of the machine, and to the crank bend is connected a hand lever 31 for effecting this rocking movement. The crank bend may be placed in three positions. In one position the pinion 29 is in mesh with the gear 23, and in another position with the gear 24, whereas in the third position the pinion is out of mesh with both gears, and the spur gear 28 is also out of mesh with the pinion 29, thus disconnecting the motor from the drive gear. In the first two positions the gear 28 is in mesh with the pinion 29. It will therefore be seen that the drive axle can be readily reversed and also stopped without reversing or stopping the motor.

Inasmuch as the gears 23 and 24 are of different diameters, two speeds are obtained by reversing the motor and the position of the pinion 25. The gear 23 is the high speed and the gear 24 the low speed gear.

The motor shaft 30 is also provided with a belt pulley 32 in order to utilize the motor as a source of power to run any kind of farm or other machinery. A suitable clutch mechanism 33 is provided for connecting the pulley 32, as well as the pinion 29, to the motor shaft, said parts being loosely mounted on the shaft. The clutch mechanism includes a hand lever 34 for actuating the same.

At 35 are indicated the plow shares, four being shown, and each of which is independently mounted on a plow beam 36. The shares are arranged as usual, obliquely of the line of travel of the machine. The beams of the two outer shares are connected, respectively, to the side bars 10, in front and to the rear of the axle 17, the points of attachment being located the same distances from the axle, and the two intermediate shares are similarly connected to the intermediate bars 11. This arrangement balances the plow beams, and places a greater part of the weight on the traction wheel, where it should be. The draft of the shares also adds to the traction of the wheels, and the deeper the plowing the better will the wheels grip without putting on extra traction strain on the steering wheel 16, where it is not needed and should be avoided as much as possible.

The front ends of the plow beams 36 are turned up and provided with a vertical series of perforations 37, and said ends extend into clevises 38 carried by the side and intermediate bars 10 and 11. By means of pins 39 passed through alined perforations in the clevis and bars, and through a selected one of the perforations 37, the vertical adjustment of the plow beams is effected.

The rear end of each plow beam is supported by a bracket having a bend at its upper end to form two side portions 40 and 41, respectively, between which the side or intermediate bar, carrying the beam, loosely extends. A pin 42 passes through the parts 40 and 41, above the bar, and between said parts, also above the bar, and close to the bend, passes the intermediate portion of a hand lever 43, pivoted at one of its ends to a bracket 44 mounted on the frame bar. The plow beam is securely fastened to the lower end of the part 40. In order to reduce friction, the parts 40 and 41 carry a roller 45 which the hand lever engages. The plow beam is thus held suspended from the hand lever. The hand lever is provided with a suitable locking device 46.

By the herein-described support for the rear ends of the plow beams, they may be left free to float by removing the pins 42; or, if desired, the beams can be locked down by locking the hand levers 43 and inserting the pins 42, said pins being so located as to extend across the bottom edge of the hand levers. The plow beams can be easily removed, as it is necessary only to lift the supporting brackets off the hand levers. To the pivoted ends of the hand levers are connected springs 47 which assist in raising the beams. The brackets also steady the rear ends of the beams, taking up side strain and vibration, and preventing the beams from springing out of line when going around curves and corners. They also keep the beams from winging over, and make it possible to use disk as well as moldboard shares. The brackets also enable the beams to be readily raised and lowered, and at the same time leaving them free and independent of the frame and of each other. The independent suspension of the plow beams is also advantageous as in the event of one of the shares meeting an obstruction, only that share needs to be lifted to clear the same.

The steering wheel 16 is vertically adjustable in the bearing bracket 13, in order to level the machine endwise, and it is held in adjusted position by a set collar 48. To the upper end of the vertical portion or stem 14 of the axle 15 of the steering wheel is secured a worm wheel 49 with which meshes a worm 50 having its shaft connected by a universal joint to a steering shaft 51 provided with a hand wheel 52. The steering shaft is in two telescoping sections in order that it may be lengthened or shortened to permit the adjustment of the steering wheel, the two sections being locked together by a set screw 53.

At diametrically opposite points, on the rim of the worm wheel 49, are lugs 54 to either one of which is adapted to be connected one end of a coiled spring 55, the other end of which is hooked or otherwise fastened to one of the bars 11. This spring acts as a counter-balance for the steering wheel, since said wheel is swiveled off the center of its periphery and therefore has a tendency to turn hard in the direction of its travel.

When using four shares, the steering wheel is located so as to run behind the rearmost share as shown in Fig. 2. This share may be removed if only three shares are desired, as for deep plowing, and the steering wheel will then be set so as to travel behind the rearmost one of the three shares. This position of the steering wheel is shown by dotted lines in Fig. 2. To place the steering wheel in the last-mentioned position, it is necessary only to disconnect the spring 55 and turn the stem 14 half way around. In this position the steering wheel is almost in direct line with the longitudinal center of the machine, which gives a well balanced machine for road and tractor work.

Referring specifically to Figs. 4 and 5, a portion of the rear end of the main frame is shown. One of the intermediate bars 11 is cut off at its rear end, and a header extending from the other intermediate bar to the outside bar 10 on the land side of the machine is put in. This header is a diagonal bar 56 extending parallel to and in spaced relation with the rear end bar 57 of the machine. In the space between these bars 56 and 57 is slidably mounted a bearing block 58 having bottom flanges 59 which extend beneath the bars. The block is also grooved at its ends, in which grooves seat transverse bolts 60 passing through the bars and serving to hold the block in adjusted position therebetween. The block 58 is slidable back and forth between the bars, upon removing the bolts 60, and is thus adjustable transversely of the machine. The steering wheel 16 is carried by a fork 61 having a stem 62, the lower end of which is externally screw-threaded. The upper end of the fork stem is without threads and has a longitudinal key-way 63 which is for a purpose to be presently described. The threaded portion of the fork stem screws into a sleeve 64 having at its lower end an outstanding flange 65. The sleeve 64 passes loosely through the block 58 and through a cylindrical bearing 66 rising from the top thereof. The flange 65 is located beneath the bottom of the block 58 and between said parts are located anti-friction balls 67. On the part 66 is mounted a bracket 68, said bracket having a cylindrical portion 69 which fits around said part 66. The bracket has a bearing 70 which supports the shaft 71 of the steering handle 72, and also a bearing 73 for the shaft 74 of a worm 75. The shafts 71 and 74 are connected by a universal joint 76. The upper unthreaded end of the fork stem 62 extends above the sleeve 64, and on said end is mounted a worm wheel 77 which is in mesh with the worm 75. The worm wheel is keyed or otherwise made fast to the sleeve 64. From the top of the worm wheel extends a hub 78 through which the upper unthreaded portion of the fork stem 62 extends. The hub of the worm wheel has a key seat corresponding with the one in the fork stem, and a key 79 is provided which is adapted to be inserted into said key seats for locking the worm wheel and fork stem together. The key is removable in order to disconnect the worm wheel and the fork stem for a purpose to be presently described. The key has a ring 80 which fits around the upper end of the fork stem.

When the key 79 is fitted in the key seats of the fork stem and the hub of the worm wheel, the fork stem and the worm wheel are locked together, and as the worm wheel is also locked to the sleeve 64, the steering wheel is moved in the direction desired upon operating the steering handle 72. When the key 79 is removed, the worm wheel is disconnected from the fork stem, in view of which the sleeve 64 can be rotated without imparting a rotary motion to the stem 62 of the steering wheel fork, and since the sleeve 64 and the stem 62 are threaded, the rear end of the machine is raised or lowered by simply turning the hand wheel 72 in the proper direction. The ring 80 on the key 79 is to hold the latter up out of the key seats when not in use, and to prevent the same from working out when in place. The bracket arm 68 is made fast to the part 66 by means of a set screw 81 passing through the part 69.

The bearing block 58 is held in adjusted position between the bars 56 and 57 by means of the transverse bolts 60 at each end of said block. To shift the steering wheel to the position shown by dotted lines in Fig. 6, the inside bolt 60 is removed and placed at the inner end of the bars 56 and 57. The steering wheel is then turned in line with the space between the bars 56 and 57 and the machine is backed up, which will cause the bearing block 58 to slide to the dotted line position whereby the steering wheel comes in line with the third plowshare. The bolt 60 at the outer end of the bars 56 and 57 is then moved up to the outer end of the bearing, and the latter is then locked in the new position.

A machine constructed as herein described fills the gap between the horse drawn plow and the big traction engines that drag the plows behind and are too big and clumsy, as well as too expensive, for the average farmer on a quarter or half section of land. Instead of dragging the shares behind and making it impossible to get into corners or near fences, the shares are carried by the frame on which the motor is mounted, the traction wheels being in front and the steering wheel behind. The machine does not take up as much room in the field as a gang plow and four horses, and it will plow clear around corners without the shares cutting across and without the traction wheels running out on the plowed land. The traction wheels are located in front of the shares and always run on the land, thereby keeping the machine and the motor level.

The preferred embodiment of the invention has been shown, but it will be evident that various minor changes in the structural details may be made without a departure from the spirit and scope of the invention.

I claim:

1. The combination of a frame, a transverse axle at the front end of the frame, traction wheels carried by the axle, a vertically swiveled steering wheel at the rear end of the frame, and adjustable toward and from the longitudinal center of the frame, steering wheel operating means carried by the frame, and an adjustable connection between said means and the steering wheel.

2. The combination of a wheeled frame having spaced bars extending obliquely thereof, a steering wheel, a support for the steering wheel slidably mounted between said bars, and adjustable fastening means carried by the bars and passing across the ends of the support.

3. The combination of a wheeled frame, a steering wheel, a support for the steering wheel, said support having an externally threaded stem, a sleeve into which the stem screws, a support for the sleeve, means for rotating the sleeve, and means for coupling the stem to said means for rotating the sleeve.

4. The combination of a wheeled frame, a steering wheel, a support for the steering wheel, said support having an externally threaded stem, a sleeve into which the stem screws, a support for the sleeve, a gear connected to the sleeve for rotating the same, operating means for the gear, and means for locking the gear with the aforesaid stem.

5. The combination of a wheeled frame, a steering wheel, a support for the steering wheel, said support having an externally threaded stem, a sleeve into which the stem screws, a support for the sleeve, a bracket carried by said support, a shaft carried by the bracket, a gear on the shaft, a gear connected to the sleeve and in mesh with the first-mentioned gear, means for locking the second-mentioned gear to the aforesaid stem, and operating means for the aforesaid shaft.

In testimony whereof I affix my signature in presence of two witnesses.

GEORGE E. HARRISON.

Witnesses:
D. C. FRAIZER,
H. MURRAY.